Feb. 16, 1932.   E. MEININGHAUS   1,845,092
STAKE AND HOLDER THEREFOR
Filed April 8, 1930   3 Sheets-Sheet 1
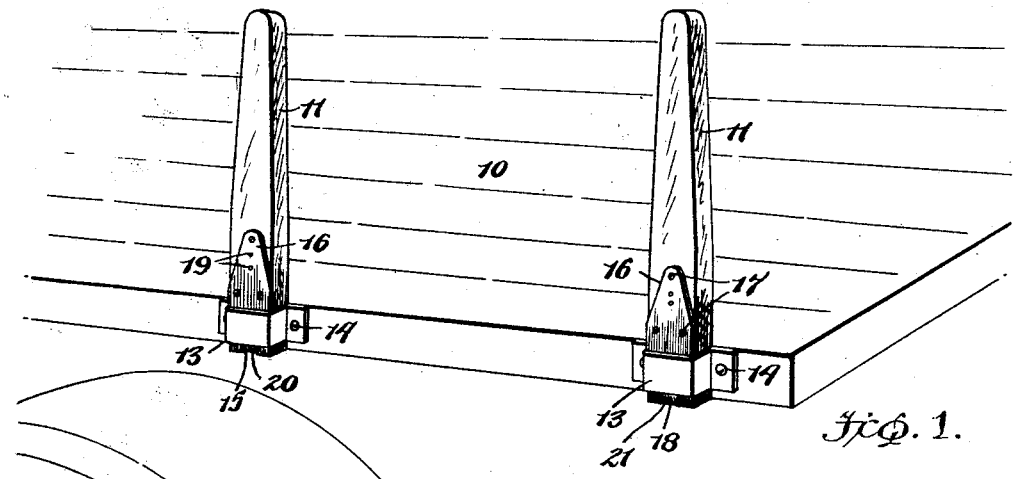
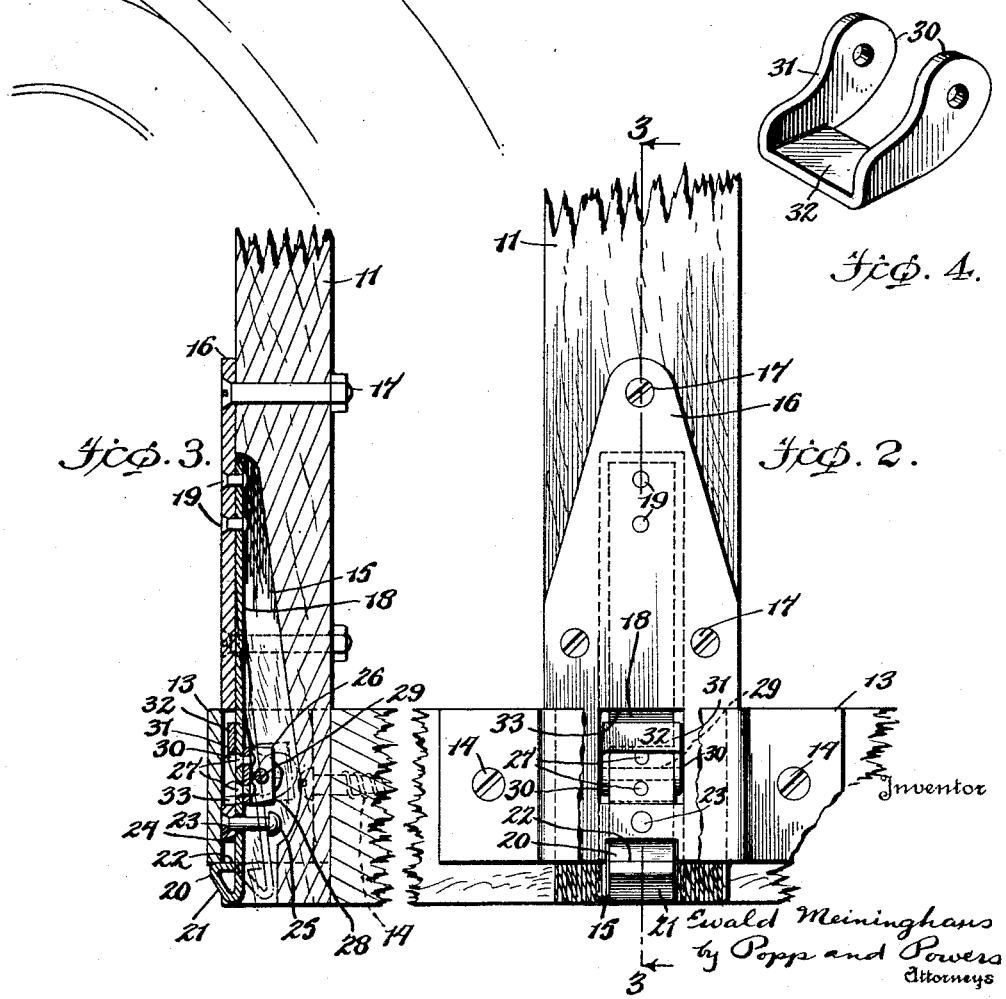

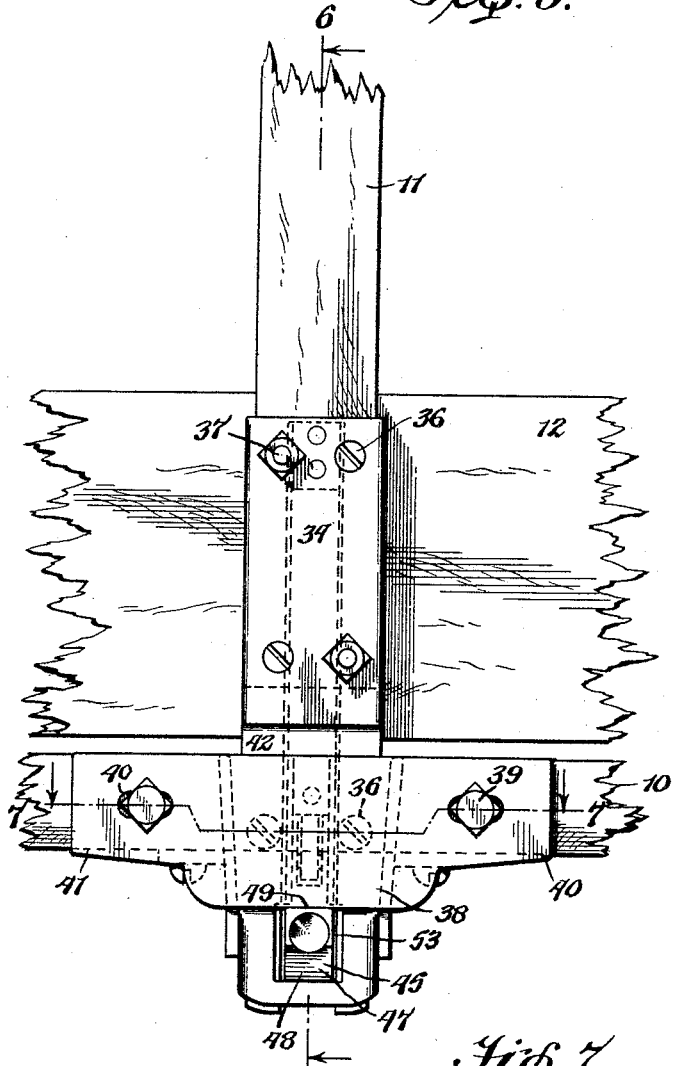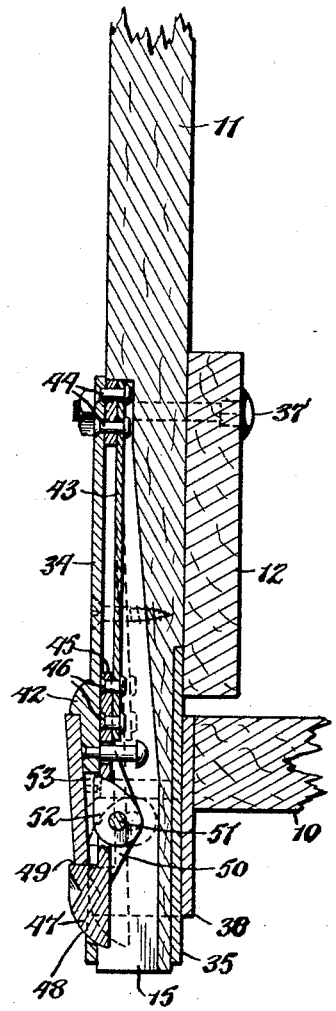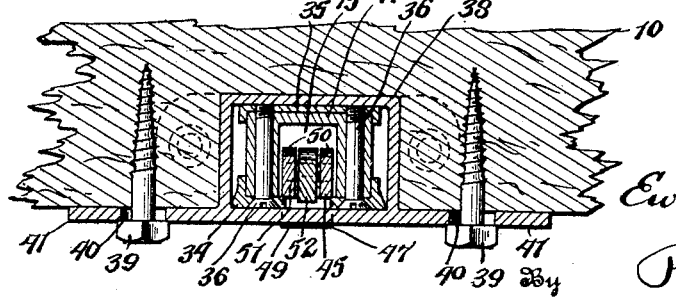

Feb. 16, 1932. E. MEININGHAUS 1,845,092
STAKE AND HOLDER THEREFOR
Filed April 8, 1930 3 Sheets-Sheet 3
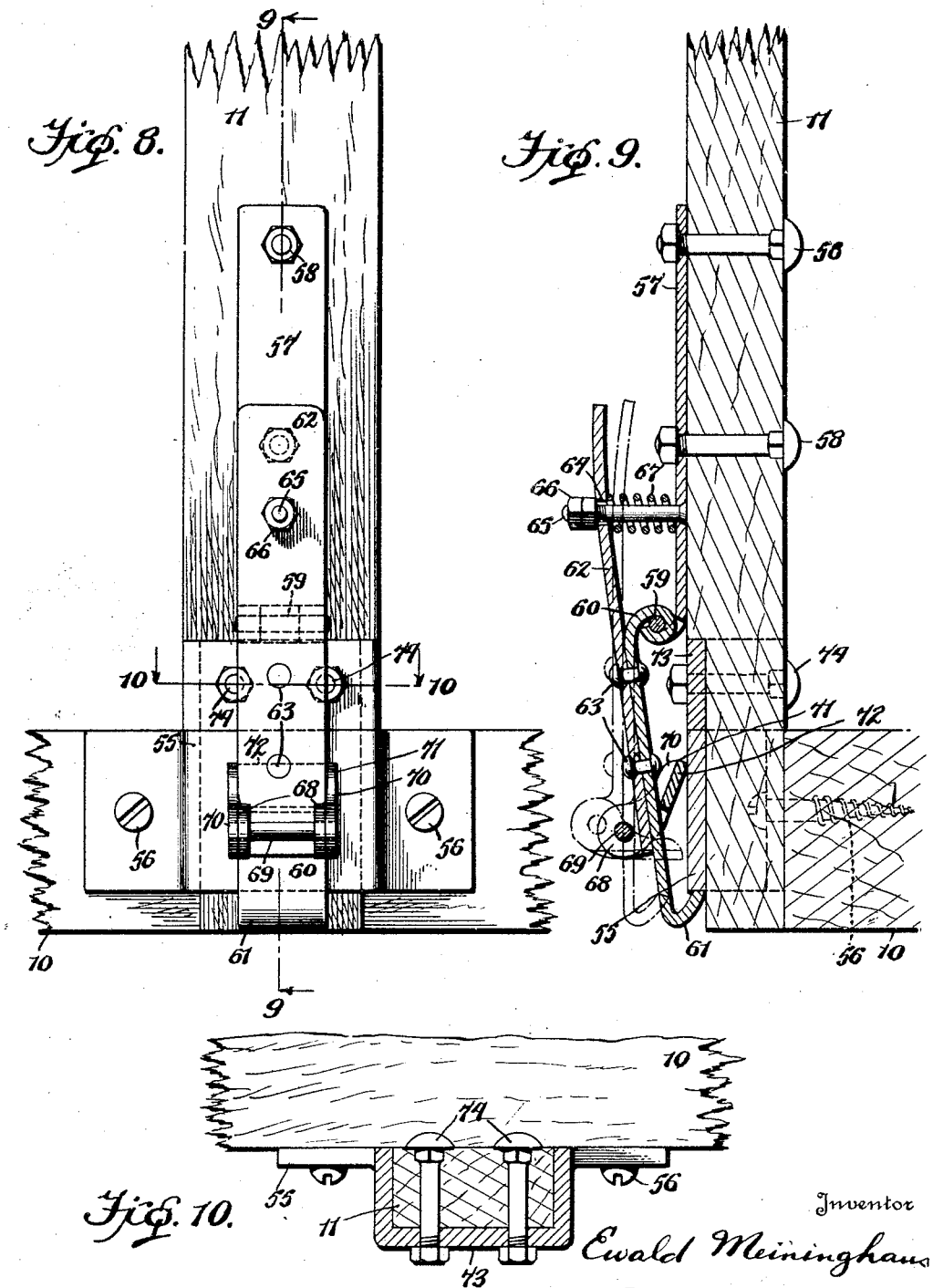

Patented Feb. 16, 1932

1,845,092

UNITED STATES PATENT OFFICE

EWALD MEININGHAUS, OF LANCASTER, NEW YORK

STAKE AND HOLDER THEREFOR

Application filed April 8, 1930. Serial No. 442,513.

This invention relates to a stake and holder therefor and more particularly to means for removably securing stakes to the sides of automobile truck bodies, such stakes being more particularly used with flat platform trucks and forming removable posts at the sides of the platform which retain the cargo on the truck but permit the ready removal of the cargo by simply removing the stakes or posts and rolling or sliding the articles off the platform.

One of the principal objects of this invention is to provide means for removably retaining stakes at the sides of an automobile truck platform or the like which automatically latch the stake in its holder or socket so that it is only necessary to place the stake in its socket and the stake or stakes are latched and held in these sockets until intentionally released. By this means there is no danger of the stake being jarred out of the socket with the consequent danger of possible loss of the articles carried by the truck.

A further purpose is to provide such a means for latching the stake in its socket which can be quickly and easily released when it is desired to remove the stake, this release being easily effected either from the floor of the truck or from the ground.

A still further aim is to provide such releasing means which when operated positively holds the stake in an unlatched condition so that it can be withdrawn at any time thereafter. By this means the stake upon being forced into its socket is automatically latched therein, the latching mechanism can be moved to release the latch and this released position is maintained until the stake is withdrawn. This greatly simplifies and expedites the procedure of releasing the stakes since all of the stakes can be released and, if necessary, the driver can mount the platform to pull the stakes from their sockets.

A further aim is to provide such a means for holding a stake in a socket which insures the stake being firmly and reliably held in an upright position and which insures against the stake becoming loose or wobbly after continued use. This is effected by sheathing both the butt of the stake and providing a metal socket so that there is a metal to metal contact between the butt and the socket.

Another object is to provide a sheathing for the butt end of each stake which consists of two plates firmly bolted together. By this means the swelling and contraction of the wood, under wet and dry conditions, does not enlarge and reduce the size of the butt of each stake so as to render it hard to be forced into the socket (when wet) or wobbly therein (when dry).

A still further purpose is to provide such a stake and holder therefor which is entirely weather-proof and in which water and dirt cannot enter to freeze or clog the latching means and prevent their ready operation.

A further purpose is to provide such a latching means which can be subjected to rough treatment, and will not get out of order therefrom, stakes of this character being frequently thrown around and other articles thrown upon them so that a delicate or unprotected latching mechanism would soon be injured or rendered inoperative under usual conditions of service.

Still further objects are to provide such a latching holder for stakes which is simple and inexpensive in construction, is easily repaired and will not get out of order under constant use and the severe vibration to which a truck body of this character is subjected.

In the accompanying drawings:

Figure 1 is a perspective view of a truck body having a flat floor and showing two stakes arranged at the sides of the floor, these stakes embodying one of the forms of the present invention.

Figure 2 is a fragmentary side elevation of the stake supported in accordance with the form of my invention shown in Fig. 1, a portion of the socket being broken away to disclose the latching mechanism for the stake.

Figure 3 is a vertical section taken on line 3—3, Fig. 2.

Figure 4 is a perspective view of the dog which holds the latching mechanism in a released condition following the manual release of this latching mechanism.

Figure 5 is a view similar to Fig. 2 showing a modified form of my invention.

Figure 6 is a vertical section taken on line 6—6, Fig. 5.

Figure 7 is a horizontal section taken on line 7—7, Fig. 5.

Figure 8 is a view similar to Figs. 2 and 6 showing a further modified form of my invention.

Figure 9 is a section taken on line 9—9, Fig. 8.

Figure 10 is a horizontal section taken on line 10—10, Fig. 8.

Similar reference numerals refer to similar parts in each of the several positions.

In its general organization this invention, in its various forms, comprises a stake the butt end of which is adapted to be received in a socket, a spring locked latch carried by the stake and movable into locking engagement with the socket when the stake is inserted so as to prevent its withdrawal, means for manually moving the latch out of engagement with said socket, and a dog which falls into its operative position upon said release of the latch and holds the latch in an inoperative position until the stake is completely withdrawn from the socket. The invention also comprehends other structural details as will appear more fully in the following description.

In Fig. 1 is illustrated a truck, the articles being conveyed being carried by a flat platform 10 and being retained thereon by stakes 11. The stakes can be entirely independent, as shown in Fig. 1, or a pair of stakes can be connected by one or more boards or bars 12, as shown in Figs. 5 and 6, so that a pair of stakes are inserted and removed as a unit and the bars 12 prevent small articles from rolling or falling off the platform 10.

In the form of my invention shown in Figs. 1–4, the butt end of each of the stakes 11 is received in a metal socket 13, this socket being composed of a U-shaped strap of metal which projects outwardly from each side of the platform and having its ends secured to the platform by screws 14 so that this strap, together with the adjacent side of the platform 10 forms a socket which receives the stake.

At its lower end the outer side of the stake 11 is channeled or hollowed out so as to form a recess 15. This recess is covered by a metal plate 16 which extends the full width of the stake and is permanently secured to the stake by a plurality of bolts 17. To the inner side of this plate 16 and arranged within the pocket or recess 15 is a leaf spring 18. This leaf spring 18 is secured to the face plate 16 by a pair of rivets 19 or in any other suitable manner and the lower end of this spring 18 projects below the lower end of the face plate 16 and is formed at its lower end to provide a movable detent 20. This detent 20 is formed to provide a lower inclined face or shoulder 21 and an upwardly facing abrupt shoulder 22 and the resilience of the spring 18 tends to hold the spring against the inner face of the face plate 16. It is therefore apparent that when the stake is forced downwardly into the socket 13 the inclined face 21 of the detent rides against the upper corner or edge of the socket strap 13 so that the leaf spring 18 is forced inwardly. The detent 20 thereupon rides along the inner wall of the socket strap 13 until it passes below its lower edge, after which the detent springs outwardly and engages its abrupt shoulder 22 with the underside of the socket 13. In this position, as best shown in Fig. 3, the stake is latched by the detent 20 and cannot be withdrawn. The inward movement of the spring 18 and its integrally formed detent 20 is limited by a rivet 23 which is secured to the face plate 16 and extends inwardly therewith and opening 24 provided in the spring 18, a head 25 being provided at the rear end of this rivet, this head 25 being larger than the hole 24 so as to form a stop limiting inward movement of the spring.

When it is desired to release the latching means the driver of the truck presses the detent 20 inwardly until it clears the lower edge of the strap forming the socket 13. When this is done a dog falls by gravity so as to hold the spring 18 and its detent 20 in this inoperative position until the stake is physically withdrawn, this dog being preferably constructed and mounted as follows:

A U-shaped bracket 26 is secured to the rear side of the spring 18 by rivets 27 or in any other suitable manner, and this bracket is formed to provide rearwardly projecting wings or flanges 28 at its opposite ends. These wings 28 carry a pivot pin 29 and to this pivot pin 29 are secured the rearwardly projecting arms 30 of a dog 31. The two arms 30 of the dog 31 are connected by an integrally formed cross bar or piece 32. Immediately in front of this dog 31 the face plate 16 is cut away so as to form a rectangular opening 33, this rectangular opening being of sufficient size so that the dog 31 is free to fall forwardly until the cross piece or bar 32 is horizontally disposed, in which position the inner edge of this cross bar or piece engages the outer face of the spring 18 and is held against further falling movement. The lower edges of the arms 30 of this dog are rounded, as best shown in Fig. 4, so that when the stake is forced downwardly into the socket 13 these rounded edges of the arms 30 ride against the inner upper corner of the strap forming the socket 13 and force the cross piece or bar 32 upwardly against the outer face of the spring 18. This position of the dog is indicated in Fig. 3. When, however, the truck driver releases the detent 20 from the socket by pushing this detent 20 and the spring 18 inwardly the cross piece 32 of the dog 31 falls downwardly into its horizontal position. In this position the bar 32 is arranged horizontally between the spring 18 and the inner face of the socket 13 so that it forms an abutment and prevents the return of the spring 18 and its detent 20 into latching engagement with the socket 13.

It is therefore apparent that this dog 31 will hold the spring 18 and its detent 20 out of engagement with the socket until the stake 11 is withdrawn from the socket. The truck driver can therefore release all of the detents 20 from the ground and can thereafter remove the stakes without further manipulation of the latching mechanism. This is particularly important where two stakes are joined together or where the truck driver has to pull the stakes from above to release them since it would be inconvenient if not impossible to hold manually the latching mechanism released while he is withdrawing the stake or stakes under these conditions. Both the detent 20 and the dog 31 ride into the socket, as described, and the detent 20 engages the lower edge of the socket when the stake is fully inserted.

In the form of the invention shown in Figs. 5–7 the stake 11 is similarly provided with a recess 15 at its lower end and this recess is covered by a metal sheath composed of front and rear plates 34 and 35 which receive between them the butt of the stake. These metal plates are secured to the stake 11 by screws 36 which pass through both plates and the stake and by the bolts 37 which also secure the cross bar 12 to the stakes. By sheathing the butt end of the stake between two plates held firmly together by bolts, the wood is securely clamped and the swelling of the wood is prevented from expanding and the drying of the same prevented from contracting the butt of the stake so that under all conditions the butt of the stake fits firmly in the socket which receives it. The sheath composed of the plates 34 and 35 is received in a metal socket 38 which as shown is set into the side of the platform 10 and is secured thereto by a pair of screws or bolts 39 which pass through slots 40 provided in wings 41, which wings project outwardly from the sides of the socket 38. The sheath plate 34 is provided with a stop 42 which limits the downward movement of the sheath into the socket 38 and both the sheath and the socket are preferably tapered to insure a snug fit. A leaf spring 43 is secured at its upper end to the inner side of the front wall of the sheath 35 by a pair of rivets 44, or the like, and is arranged within the recess 15 of the stake. To the lower end of this spring 43 is secured a latch bar 45, this latch bar being secured by rivets 46 or in any other suitable manner. This latch bar is formed at its lower end to provide a detent 47 having a rounded lower face or shoulder 48 and an abrupt upper shoulder 49 so that when the stake 11 is forced downwardly into the socket 38, the rounded face 48 of the detent rides into the socket 38 and when the detent 47 passes below the lower edge of the socket 38 the abrupt shoulder 49 springs into engagement with this lower edge of the socket 38 and prevents the upward removal of the stake 11. The latch bar 45 is also formed to provide a pair of rearwardly projecting wings 50 which carry a horizontal pivot pin 51. This pivot pin 51 carries a dog 52 which is composed of a single piece of flat metal and which normally falls through an opening 53 provided in the sheath 35, the detent 47 also moving through this opening.

When the truck driver wishes to release the detent 49 from the socket 38 he presses the detent 47 inwardly and the holding dog 52 drops down until it falls horizontally across the space between the latch bar 45 and the outer wall of the socket 38 and thereby prevents the latch bar 45 from returning under the influence of its spring 43 until the stake has been completely withdrawn from the socket and is re-inserted.

In the form of the invention shown in Figs. 8–10 the lower end of the stake 11 is reduced and is received in a socket 55 which is of the same form as the socket 13 shown in Figs. 1–4 and is similarly secured by screws 56. To the outer side of the stake 11 a plate 57 is secured by means of bolts 58 or in any other suitable manner and the lower end of this plate carries a pivot pin 59 about which a latched bar 60 pivots. This latched bar 60 is formed at its lower end to provide an inturned hook 61 which, when the stake is forced downwardly into the socket 55, is adapted to engage the under edge of the socket and prevent the upperward displacement of the stake. A bar 62 is secured to the latched bar 60 by rivets 63 or in any other suitable manner and projects upwardly therefrom. This bar 62 is provided with a hole 64 which receives the end of a bolt or rivet 65. This rivet is secured at one end to the face plate 57 and at its outer end is provided with a head 66 composed of two nuts which limit the outward movement of the bar 62. A helical compression spring 67 is interposed between the face plate 57 and the bar 62 and surrounds the rivet 65 so as to hold the bar 62 outwardly and the detent or inturned end 61 of the latched bar 60 inwardly. With this construction it is apparent that when the stake 11 is forced downwardly into the socket 55 the detent 61 rides over the outer wall of this socket. When the detent 61 rides beyond the lower end of the socket the spring 67 forcing the arm or bar 62 outwardly forces the detent 61 under the lower edge of the socket 55 and prevents the upper displacement of the stake.

The arm or bar 62 is formed at its lower end to provide a pair of wings 68 which carry a horizontal pivot pin 69. This pivot pin 69 carries the end wings 70 of a dog 71 which has a cross bar 72 similar to the dog shown in Fig. 4. This cross bar 72 is interposed between the latch bar 60 and the socket 55 while the arms 70 are arranged at the sides of this latch bar so that when the truck driver wishes to release the latch he merely presses the upper end of the bar or arm 62 inwardly so as to simultaneously release the detent 61 from the lower edge of the socket 55 and also cause the cross bar 72 of the dog 71 to fall into a horizontal position between the latch bar 60 and the socket 55. In this position the dog 71 prevents the return of the detent 61 into engagement with the lower edge of the socket 55 under the influence of the spring 67 and thereby holds the latching mechanism in its inoperative condition until the stake has been removed. While the stake 11 is being inserted the dog 71 rides over the outer edge of the socket 55 and assumes its inoperative position shown in Fig. 9.

In this form of the invention a U-shaped metal abutment 73 is preferably secured to the butt end of the stake by a pair of bolts 74 or in any other similar manner, this U-shaped abutment forming a stop which limits the downward movement of the stake in the socket, as best shown in Fig. 9.

In all of the forms of the present invention the stake is automatically latched upon being inserted in the socket and in the means for releasing the latch a dog is incorporated so as to hold the latch in its inoperative position after the latch has been released and until the stake is completely withdrawn. By this means the unlatching and withdrawal of the stake can be performed as separate operations which greatly increases the convenience of removal of the stake.

In each of the forms, particularly in the form shown in Figs. 5-8 adequate provision is made for securing a reliable setting of the stake in the stake holder or socket and a metal to metal contact is provided to prevent undue wear and consequent looseness of the stake in the stake holder after continued use.

In all of the forms, particularly in the forms shown in Figs. 1-8 adequate provision is made against the entrance of rain and dirt to prevent the obstruction of the latching mechanism through freezing or clogging.

In each of the forms, particularly in the form shown in Figs. 1-8, the latching mechanism is well guarded so that should the stake be thrown to the ground or objects thrown upon it the same will not break the latching mechanism and render it inoperative.

In all of the forms the invention is simple and inexpensive in construction, can be easily repaired, and will not get out of order through severe and constant use.

I claim as my invention:

A stake and socket therefor, said stake being recessed at the end inserted into said socket and said socket having the vertical opening which receives said stake extending completely therethrough, a plate secured to the side of said stake and extending over said recess, a flat spring arranged in said recess and secured at its upper end to said plate, a latch member secured to the lower end of said spring and projecting outwardly beyond said plate, the projecting part of said latch member being such that upon inserting said stake in said socket said latch member is moved inwardly and upon clearing the lower edge of said socket said latch member springs into engagement therewith and prevents withdrawal of said stake, a pivot pin secured to said latch member and a dog carried by said pivot pin and being moved inwardly by the upper edge of said socket to an inoperative position when said stake is inserted in said socket, said dog being so arranged that when said latch member is manually moved inwardly out of engagement with said socket said dog falls forwardly against said socket and prevents the re-engagement of said latch member until after said stake has been withdrawn.

In testimony whereof I hereby affix my signature.

EWALD MEININGHAUS.